United States Patent [19]
von Starck et al.

[11] 3,713,639
[45] Jan. 30, 1973

[54] MELTING OR HOLDING VESSEL FOR LIQUID METALS WITH AN ADJOINING ELECTROMAGNETIC CONVEYING TROUGH

[75] Inventors: Axel von Starck, Remscheid-Luttringhausen; Friedrich Schnake, Rheinhausen, both of Germany

[73] Assignee: AEG Elotherm GmbH, Remscheid-Hasten, Germany

[22] Filed: Aug. 10, 1971

[21] Appl. No.: 170,476

[30] Foreign Application Priority Data

Aug. 21, 1970 Germany.....................P 20 41 559.2

[52] U.S. Cl..................................266/38, 266/34 R
[51] Int. Cl..................................................C21c 7/00
[58] Field of Search....164/49; 266/1 R, 34 R, 34 PT, 266/34 V, 38, 39

[56] References Cited

UNITED STATES PATENTS 3,610,600   10/1971   Schnake....................266/34 V

Primary Examiner—Gerald A. Dost
Attorney—Cushman, Darby & Cushman

[57] ABSTRACT

A melting and holding vessel for liquid metals with an adjoining electromagnetic trough in which the active inductor surface at its bottom end adjacent the vessel and in the region of the first pole is much more steeply pitched in relation to the horizontal than in the region of the upwardly following poles and the thickness of the refractory lining between the active inductor surface and the trough bottom increases towards the end of the inductor and gradually merges into the refractory lining of the vessel, so that the risk of cracking in the transitional zone between vessel and trough is substantially avoided.

5 Claims, 1 Drawing Figure

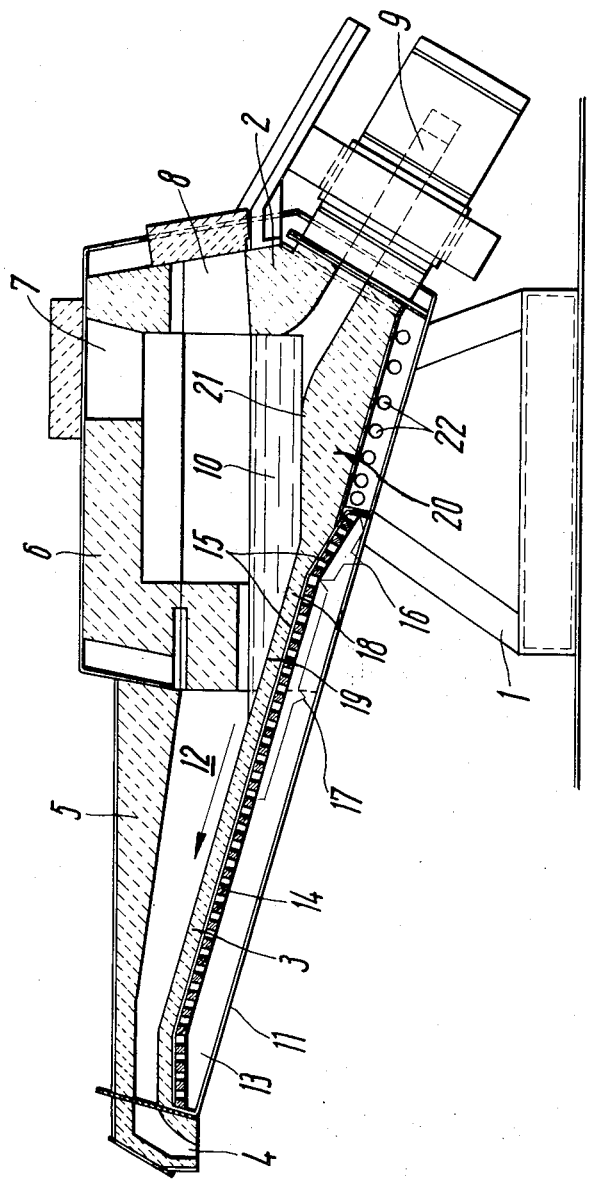

MELTING OR HOLDING VESSEL FOR LIQUID METALS WITH AN ADJOINING ELECTROMAGNETIC CONVEYING TROUGH

This invention relates to a vessel for liquid metals having a holding chamber and an adjoining electromagnetic conveying trough comprising a body ascending from a lower end that merges into the melting or holding vessel, and an inductor below that body for generating a traveling electromagnetic field to propel the liquid metal in open flow up the trough away from the holding chamber and out through a spout at the upper end of the trough.

Such an arrangement has already been described, for instance in German Patent Specification No. 1,286,264. Equipment of this kind can be used advantageously in automated foundries where it serves for discharging metered volumes of metal. Two different kinds of equipment specially adapted for metering metals, for instance for pouring exactly predetermined quantities of metal, are described in German Patent Specifications Nos. 1,286,701 and 1,291,061.

In all these previously proposed arrangements, the body of the trough directly adjoins an opening in the side of the melting or holding chamber. Since, in a traveling field inductor, the strength of the traveling field at the end of the inductor is zero and the traveling field only reaches its nominal value at a distance from the inductor and equal to somewhat more than one pole pitch, a propulsive effect sufficiently strong to overcome gravity is not applied to the metal until a point some distance away from the end of the inductor adjoining the vessel. Thus if a propulsive effect is to be achieved at all, the surface of the metal in the melting or holding chamber must therefore extend beyond this point into the body of the trough before the traveling field is switched on. For these and other reasons it is often advisable so to design a melting or holding vessel equipped with an electromagnetic trough such that the point in the trough where propulsion of the metal by the electromagnetic traveling field begins is as close as possible to the center of the metal charge in the vessel.

However, this solution is difficult in practice to carry out. The thickness of the refractory lining of the body of the trough is normally substantially less than that of the melting and holding vessel. Moreover, the hollow conductors of the inductor through which water is circulated abstract heat from the lining of the body of the trough, and the result is the generation of a temperature gradient between the refractory linings of the melting or holding chamber and of the trough and this may cause the appearance of cracks in the transitional zone between the chamber and the body of the trough—particularly if the changes in thickness between the linings of the melting or holding vessel and the body of the trough are fairly sudden and abrupt.

It is therefore the object of the present invention to provide a melting or holding vessel having an adjoining electromagnetic conveying trough in which the risk of such cracking is substantially avoided. According to the invention this is achieved in that the active inductor surface at its bottom end adjacent the vessel and in the region of the first pole is much more steeply pitched in relation to the horizontal than in the region of the upwardly following poles, and in that the thickness of the refractory lining between the active inductor surface and the surface of the bottom of the trough in the region of the first pole adjacent the vessel increases at least at a fairly uniform rate towards the end of the inductor and thus merges gradually into the greater thickness of the refractory lining of the melting or holding chamber. Thus the end of the active inductor surface adjacent the chamber extends to a location below the bottom of the melting or holding vessel.

In a preferred embodiment of the invention the bottom of the trough merges into the bottom of the chamber substantially continuously. Yet another aspect of the invention is that the thickness of the lining of the vessel bottom increases in the direction away from the trough at least substantially at an even rate, at least in a zone of the chamber bottom that adjoins the lining of the trough above the final pole of the inductor.

Further according to another aspect of this invention, the underside of the refractory lining of the chamber bottom may be provided with conventional cooling devices, at least in part of the region of the lining that adjoins the lining of the trough.

The invention will be hereinafter described with reference to the drawing which illustrates an embodiment of the invention.

The drawing is a schematic representation in section of a holding furnace equipped with inductive heating means and provided with an adjoining electromagnetic conveying trough. The furnace vessel or chamber 2 stands on a base 1, and body 3 of the electromagnetic conveying trough rises obliquely from one side of the chamber and terminates in a pouring spout 4. Above the body 3 of the trough is a cover 5, and the furnace vessel or chamber 2 is conventionally closed by a roof 6 having an opening 7 that can be closed. On the side remote from the conveying trough, the furnace chamber 2 has an opening 8 which can likewise be closed and which is used for skimming off the slag. On this side the vessel is also provided—descending from the vessel bottom—with an inductive heating channel 9 for heating the liquid metal charge 10 in furnace chamber 2.

An inductor 11 is disposed below body 3 of the trough for generating a traveling electromagnetic field which propels the liquid metal in open flow up body 3 of the trough in the direction of arrow 12 and out through pouring spout 4. Traveling field inductor 11 is conventionally constructed like the stator of a linear three-phase motor and preferably includes a laminated metal core 13 and an inductor winding 14. Inductor 11 is so shaped that its active surface 15, in the region 16 of the first pole of the furnace vessel end of the trough, has a mean upward pitch with respect to the horizontal that substantially exceeds that of the following poles in the region 17. The thickness of the refractory lining 18, between the active inductor surface 15 and the surface 19 of the bottom of the trough in the region 16 of the first inductor pole at the vessel end, increases at an even rate towards the end of the inductor and finally merges into the thickness of the refractory lining 20 of the bottom of the furnace vessel 2. The end of the active inductor surface 15 adjacent the furnace vessel extends to a point underneath the floor of the furnace vessel 2, whereas the surface 19 of the bottom of the trough merges evenly into the surface 21 of the bottom of the furnace vessel 2.

In the region of the bottom of the furnace vessel which adjoins the lining 18 of the trough above the first pole at the bottom end of the inductor, the thickness of the refractory lining 20 on the vessel floor likewise increases at a uniform rate with increasing distance from the end of the trough. In this region the bottom of the vessel is also provided with conventional cooling devices 22 which extend the cooling effect of the coolant-traversed inductor winding into the refractory lining of the furnace floor and thereby substantially prevent the appearance of thermal stress in the refractory lining.

Many changes and modifications in the above described embodiment of this invention can of course be made without departing from the scope of the invention. Accordingly, that scope is intended to be limited only by the scope of the appended claims.

What is Claimed is:

1. In a vessel for liquid metals comprising a holding chamber lined with refractory material and an adjoining electromagnetic conveying trough having a body including a refractory lining which merges into the refractory lining of said chamber ascending from a lower end merging into the holding chamber and an inductor below the body with a plurality of poles for generating a traveling electromagnetic field to propel the liquid metal in open flow up the trough away from the holding chamber and out through a spout at the upper end of the trough, the improvement wherein the surface of the inductor at its bottom end adjacent the chamber and in the region of the first pole adjacent the bottom end is much more steeply pitched with respect to the horizontal than in the region of the upwardly following poles, and wherein the thickness of the refractory lining between the surface of the inductor and the surface of the bottom of the trough in the region of the first pole adjacent the chamber increases at least at a substantially uniform rate towards the end of the inductor and merges into the greater thickness of the refractory lining of the holding chamber so as to avoid cracking in the transitional region between the holding chamber and the trough.

2. In a vessel as in claim 1, the further improvement wherein the end of the inductor surface at the holding chamber extends below the floor of the chamber.

3. In a vessel as in claim 1, the further improvement wherein the surface of the bottom of the trough merges at least substantially continuously into the surface of the floor of the holding chamber.

4. In a vessel as in claim 1, the further improvement wherein the thickness of the lining of the chamber floor increases at least substantially at a uniform rate in the direction away from the trough, at least in a region of the chamber floor which adjoins the lining of the trough above the last inductor pole at the chamber end of the trough.

5. In a vessel as in claim 1, the further improvement wherein the underside of the refractory lining of the chamber floor is provided with cooling means, at least in part of the region adjoining the refractory lining of the trough.

* * * * *